(12) United States Patent
Beckley et al.

(10) Patent No.: US 9,728,772 B2
(45) Date of Patent: *Aug. 8, 2017

(54) FLOODED LEAD-ACID BATTERY AND METHOD OF MAKING THE SAME

(71) Applicants: TROJAN BATTERY COMPANY, LLC, Santa Fe Springs, CA (US); Roy Duffy, Auckland (NZ)

(72) Inventors: Gordon Beckley, Grayson, GA (US); Marvin C. Ho, Yorba Linda, CA (US); Colin Smith, Grayson, GA (US); Charles E. Snyder, Placentia, GA (US)

(73) Assignee: Trojan Battery Company, LLC, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/230,799

(22) Filed: Mar. 31, 2014

(65) Prior Publication Data

US 2016/0056454 A1 Feb. 25, 2016
US 2016/0380260 A9 Dec. 29, 2016

Related U.S. Application Data

(63) Continuation of application No. 13/760,673, filed on Feb. 6, 2013, now Pat. No. 8,722,249, which is a
(Continued)

(51) Int. Cl.
*H01M 4/13* (2010.01)
*H01M 4/56* (2006.01)
(Continued)

(52) U.S. Cl.
CPC .............. *H01M 4/14* (2013.01); *H01M 4/20* (2013.01); *H01M 4/364* (2013.01); *H01M 4/48* (2013.01);
(Continued)

(58) Field of Classification Search
CPC .......... H01M 4/14; H01M 4/16; H01M 10/12; H01M 4/82; H01M 4/57
(Continued)

(56) References Cited

U.S. PATENT DOCUMENTS 660,228 A 10/1900 Sperry
2,582,845 A 1/1952 Murphy
(Continued)

FOREIGN PATENT DOCUMENTS

CN 1063582 A 8/1992
CN 102027618 B 10/2014
(Continued)

OTHER PUBLICATIONS

International Search Report dated May 29, 2009 for International Application No. PCT/US09/39817.
(Continued)

*Primary Examiner* — Patrick Ryan
*Assistant Examiner* — Julian Anthony
(74) *Attorney, Agent, or Firm* — Arent Fox LLP

(57) ABSTRACT

Positive active material pastes for flooded deep discharge lead-acid batteries, methods of making the same and lead-acid batteries including the same are provided. The positive active material paste includes lead oxide, a sulfate additive, and an aqueous acid. The positive active material paste contains from about 0.1 to about 1.0 wt % of the sulfate additive. Batteries using such positive active material pastes exhibit greatly improved performance over batteries with conventional positive active material pastes.

19 Claims, 4 Drawing Sheets

Related U.S. Application Data continuation of application No. 12/275,158, filed on Nov. 20, 2008, now Pat. No. 8,404,382.

(60) Provisional application No. 61/043,377, filed on Apr. 8, 2008.

(51) Int. Cl.

| | |
|---|---|
| *H01M 4/58* | (2010.01) |
| *H01M 4/57* | (2006.01) |
| *H01M 4/82* | (2006.01) |
| *H01M 6/00* | (2006.01) |
| *H01M 4/14* | (2006.01) |
| *H01M 4/20* | (2006.01) |
| *H01M 4/36* | (2006.01) |
| *H01M 4/48* | (2010.01) |
| *H01M 4/73* | (2006.01) |
| *H01M 10/06* | (2006.01) |
| *H01M 4/68* | (2006.01) |

(52) U.S. Cl.
CPC ............ *H01M 4/56* (2013.01); *H01M 4/73* (2013.01); *H01M 10/06* (2013.01); *H01M 4/685* (2013.01); *H01M 2220/20* (2013.01); *Y02P 70/54* (2015.11); *Y02T 10/7016* (2013.01)

(58) Field of Classification Search
USPC .................. 429/225, 227, 228; 29/623.5
See application file for complete search history.

(56) References Cited

U.S. PATENT DOCUMENTS

| | | |
|---|---|---|
| 3,050,577 A | 8/1962 | Harris et al. |
| 4,422,917 A | 12/1983 | Hayfield |
| 4,507,372 A | 3/1985 | Rowlette |
| 4,547,443 A | 10/1985 | Rowlette et al. |
| 4,594,301 A | 6/1986 | Miyazaki et al. |
| 4,625,395 A | 12/1986 | Rowlette |
| 4,629,516 A | 12/1986 | Myers |
| 4,735,870 A | 4/1988 | Rowlette |
| 4,889,778 A | 12/1989 | Misra et al. |
| 4,978,601 A | 12/1990 | Kim et al. |
| 5,225,298 A | 7/1993 | Nakayama et al. |
| 5,302,476 A | 4/1994 | Kao et al. |
| 5,549,990 A | 8/1996 | Clough et al. |
| 5,601,945 A | 2/1997 | Clough |
| 5,633,081 A | 5/1997 | Clough et al. |
| 5,820,639 A | 10/1998 | Snyder et al. |
| 6,117,196 A | 9/2000 | Snyder et al. |
| 6,180,286 B1 | 1/2001 | Rao et al. |
| 6,225,005 B1 | 5/2001 | Shiomi et al. |
| 6,495,288 B2 | 12/2002 | Shiomi et al. |
| 6,579,647 B2 | 6/2003 | Gillman et al. |
| 6,582,482 B2 | 6/2003 | Gillman et al. |
| 6,833,216 B2 | 12/2004 | Snyder et al. |
| 7,160,645 B2 | 1/2007 | Kozawa et al. |
| 8,404,382 B2 * | 3/2013 | Beckley ............... H01M 4/20 429/223 |
| 2002/0068219 A1 | 6/2002 | Snyder et al. |
| 2009/0253041 A1 | 10/2009 | Beckley |

FOREIGN PATENT DOCUMENTS

| | | |
|---|---|---|
| EP | 08948916 A1 | 6/1998 |
| GB | 1320750 | 6/1973 |
| JP | 54-49538 | 4/1979 |
| JP | 04-014760 | 1/1992 |
| JP | 04-196059 | 7/1992 |
| JP | 05-054881 | 3/1993 |
| JP | 08-180876 | 7/1996 |
| JP | 09-289020 | 11/1997 |

OTHER PUBLICATIONS

Extended European Search Report dated Jul. 14, 2011, for corresponding application No. 09729522.4.
Wei et al., Electrochemical behaviour of $SnSO_4$ in sulfuric acid solution, Journal of Power Sources 52 (1994) pp. 81-85.
Rogachev et al., Influence of cycling on the nature of the positive active mass of lead/acid batteries and effect of $CaSO_4$ on the behaviour of the positive plates, Journal of Power Sources 64 (1997) pp. 51-56.
EP Communication and Annex dated Sep. 2, 2015 regarding EP09729522.4.
EP Search Opinion dated Jul. 14, 2011 regarding EP09729522.4.
China Office Action dated Dec. 18, 2015 regarding China Application No. CN201410460625.6, and English translation.
China Office Action dated Oct. 23, 2012 regarding China Application No. CN200980117480.7, and English translation.
Second China Office Action dated Jul. 2, 2013, regarding China Application No. CN200980117480.7, and English translation.
Third China Office Action dated Mar. 24, 2014, regarding China Application No. CN200980117480.7, and English translation.
Mexico Office Action dated Jan. 24, 2012 regarding Mexico Application No. MX/a/201011121, and English translation.
Mexico Office Action dated Oct. 24, 2012 regarding Mexico Application No. MX/a/201011121, and English translation.
Taiwan Office Action dated Jan. 1, 2014 regarding Taiwan Application No. TW98111662, and English translation.
Taiwan Office Action dated Jun. 26, 2015 regarding Taiwan Application No. TW98111662, and English translation.
Second China Office Action dated Aug. 5, 2016 regarding China Application No. CN201410460625.6, and English translation.
First Examination Report dated May 19, 2017, regarding India Application No. 7242/DELNP/2010.
European Communication dated May 8, 2017, regarding EP Application No. EP09729522.4.

* cited by examiner

FLOODED LEAD-ACID BATTERY AND METHOD OF MAKING THE SAME

CROSS REFERENCE TO RELATED APPLICATION(S)

This application is a continuation of U.S. patent application Ser. No. 13/760,673 filed on Feb. 6, 2013, which is a continuation of U.S. patent application Ser. No. 12/275,158, filed on Nov. 20, 2008, now issued as U.S. Pat. No. 8,404,382, which claims the benefit of U.S. Provisional Application No. 61/043,377, filed on Apr. 8, 2008, the entire contents of which are incorporated herein by reference.

FIELD OF THE INVENTION

The present invention relates to flooded or wet cell lead-acid electrochemical batteries, and more particularly to positive active material pastes for use in such batteries and to methods of making and using the same.

BACKGROUND OF THE INVENTION

A typical flooded lead-acid battery includes positive and negative electrode grids and an electrolyte. The electrode grids, while primarily constructed of lead, are often alloyed with antimony, calcium, or tin to improve their mechanical characteristics. Antimony is generally a preferred alloying material for deep discharge batteries.

In a flooded lead-acid battery, positive and negative active material pastes are coated on the positive and negative electrode grids, respectively, forming positive and negative plates. The positive and negative active material pastes generally comprise lead oxide (PbO or lead (II) oxide.) The electrolyte typically includes an aqueous acid solution, most commonly sulfuric acid. Once the battery is assembled, the battery undergoes a formation step in which a charge is applied to the battery in order to convert the lead oxide of the positive plates to lead dioxide ($PbO_2$ or lead (IV) oxide) and the lead oxide of the negative plates to lead.

After the formation step, a battery may be repeatedly discharged and charged in operation. During battery discharge, the positive and negative active materials react with the sulfuric acid of the electrolyte to form lead (II) sulfate ($PbSO_4$). By the reaction of the sulfuric acid with the positive and negative active materials, a portion of the sulfuric acid of the electrolyte is consumed. However, the sulfuric acid returns to the electrolyte upon battery charging. The reaction of the positive and negative active materials with the sulfuric acid of the electrolyte during discharge may be represented by the following formulae.

Reaction at the negative electrode:

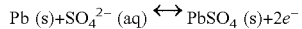
$$Pb\ (s) + SO_4^{2-}\ (aq) \longleftrightarrow PbSO_4\ (s) + 2e^-$$

Reaction at the positive electrode:

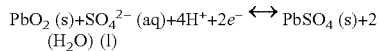
$$PbO_2\ (s) + SO_4^{2-}\ (aq) + 4H^+ + 2e^- \longleftrightarrow PbSO_4\ (s) + 2(H_2O)\ (l)$$

As shown by these formulae, during discharge, electrical energy is generated, making the flooded lead-acid battery a suitable power source for many applications. For example, flooded lead-acid batteries may be used as power sources for, electric vehicles such as forklifts, golf cars, electric cars, and hybrid cars. Flooded lead-acid batteries are also used for emergency or standby power supplies, or to store power generated by photovoltaic systems.

To charge a flooded lead-acid battery, the discharge reaction is reversed by applying a voltage from a charging source. During charging, the lead sulfate reacts with oxygen molecules from ionized water to produce lead and lead dioxide. The lead dioxide is deposited on the positive electrode and the lead is deposited on the negative electrode.

The lead dioxide deposited on the positive electrode is known to exist in two different crystalline structures, $\alpha$-$PbO_2$ and $\beta$-$PbO_2$. Of these, $\alpha$-$PbO_2$ tends to have a larger size crystal providing lower surface area over $\beta$-$PbO_2$ which has a smaller size crystal with higher surface area. In batteries, the larger crystal size and lower surface area of $\alpha$-$PbO_2$ tends to lower initial battery capacity, but provides longer life compared to the smaller crystal size and larger surface area of $\beta$-$PbO_2$ which tends to provide higher initial battery capacity, but shorter battery life. Upon initial formation, the positive active material paste of a typical deep discharge flooded lead-acid battery tends to exhibit an $\alpha$-$PbO_2$ to $\beta$-$PbO_2$ ratio of about 1.2 or higher.

The addition of tin sulfate to positive electrode in flooded batteries is known, but is generally limited to use in batteries that use positive electrodes made of lead-calcium alloys. Batteries using lead-calcium alloy positive electrode grids are known to suffer from the development of a poorly defined corrosion layer at the surface of the grid which can limit battery life. It has been suggested that the addition of tin to the alloy from which the grid is made, or the application of tin to the surface of a grid will form a tin-enriched layer at the surface of the grid, and in doing so, will improve the properties of the corrosion layer at the interface surface of the grid. However, it is also generally recognized that positive electrode grids of a lead-antimony alloy have well defined corrosion layers, and therefore, would not benefit from the formation of a tin-enriched layer. Moreover, it is also generally recognized that any tin provided at the positive electrode grid will tend to migrate to the negative electrode grid during battery use, and in doing so, will change the half potential of the negative electrode grid and adversely affect the recharge characteristics of the battery.

SUMMARY OF THE INVENTION

An embodiment of the present invention is directed to an improved positive active material paste for a flooded deep discharge lead-acid battery of the type that includes lead-antimony alloy positive electrode grids. Such a positive active material paste includes lead oxide, a metal sulfate additive, and sulfuric acid. The positive active material paste may optionally include a binder such as polyester fiber. According to one embodiment, the metal sulfate is tin sulfate. For such an embodiment, the metal sulfate additive may be present in the paste in an amount of about 0.2 wt % or less on a dry basis. In another embodiment, the tin sulfate additive is present in the paste in an amount of about 0.18 wt % on a dry basis. Upon battery formation, the lead oxide of the paste is converted to lead dioxide, and it is believed the metal sulfate is similarly converted to an oxide of the metal.

In an embodiment of the invention, the molar ratio of lead to metal (or metal oxide) for the positive active material paste ranges from about 200:1 to about 825:1. In one exemplary embodiment, the molar ratio of lead to the metal (or metal oxide) is greater than about 450:1 (corresponding to an initial amount of tin sulfate (when tin sulfate is the additive) of about 0.22 wt % on a dry basis). In another embodiment, the lead to metal additive molar ratio of the positive active material paste is between about 450:1 and about 650:1 (corresponding to an initial amount of tin sulfate (when tin sulfate is the additive) ranging from about 0.15 to about 0.22 wt. % on a dry basis). In yet another embodiment, the lead to metal additive molar ratio of the positive active material paste is about 500:1 (corresponding to an initial amount of tin sulfate (when tin sulfate is the additive) of about 0.2 wt % on a dry basis).

For embodiments where tin is used as the metal additive, the tin may be provided to the paste as tin sulfate. For such embodiments, the lead to tin weight ratio of the positive active material paste may be greater than about 800:1 (corresponding to an initial amount of tin sulfate of about 0.22 wt % on a dry basis). In another embodiment, the lead to tin weight ratio of the positive active material paste is between about 800:1 and about 1100:1 (corresponding to an initial amount of tin sulfate ranging from about 0.15 to about 0.22 wt % on a dry basis). In yet another embodiment, the lead to tin weight ratio of the positive active material paste is about 900:1 (corresponding to an initial amount of tin sulfate of about 0.19 wt % on a dry basis).

Without being bound by theory, it is believed that after battery formation, the resulting paste has a smaller crystal structure and therefore a higher surface area after curing when compared to conventional positive active material pastes. Furthermore, the inclusion of a metal additive, such as tin, in a weight ratio of about 900:1 can lower the $\alpha$-$PbO_2$ to $\beta$-$PbO_2$ ratio of the formed battery to between about 0.8 and 1.0, resulting in a battery with both high initial capacity and long battery life.

The metal additive is generally provided as a metal sulfate in the positive active material paste prior to formation. Suitable sulfates other than tin sulfate may include sulfates of zinc ($ZnSO_4$), titanium oxide ($TiOSO_4$), calcium ($CaSO_4$), potassium ($K_2SO_4$), bismuth ($Bi_2(SO_4)_3$) and indium ($In_2(SO_4)_3$).

Another embodiment of the invention is directed to a method for preparing a positive active material paste for a flooded deep discharge lead-acid battery of the type that includes lead-antimony alloy grids. Such a method includes mixing lead oxide, a binder such as polyester fiber, and a sulfate additive to form a dry mixture, adding water to the dry mixture and wet-mixing the resulting mixture. Acid is then added to form the positive active material paste.

In another embodiment of the present invention, a flooded deep discharge lead-acid battery includes the positive active material paste. Such a flooded deep discharge lead-acid battery includes a positive electrode grid alloyed with antimony. The positive active material paste as described above is applied to the positive electrode grid. In one embodiment, for example, the positive electrode grid includes from about 2 to about 11 wt % antimony. In another embodiment, the positive electrode grid includes from about 2 to about 6 wt % antimony. While some amount of antimony is desirable to improve the mechanical characteristics of the grid, if too much antimony is added, it can cause undesirable gassing of the finished battery, and can also drive up the cost of the grid. Consequently, there are benefits to alloys with low antimony content.

When compared to a conventional flooded deep discharge lead-acid battery of similar size and weight that does not include a metal additive in the positive active material paste, a flooded deep discharge lead-acid battery that includes a metal additive in the positive active material paste tends to retain a higher capacity over the life of the battery. Therefore, a battery of the present invention can provide higher total power output over the battery's life compared to a conventional battery.

BRIEF DESCRIPTION OF THE DRAWINGS

The above and other features and advantages of the present invention will be better understood by reference to the following detailed description when considered in conjunction with the attached drawings, in which.

DETAILED DESCRIPTION

Figure 1:
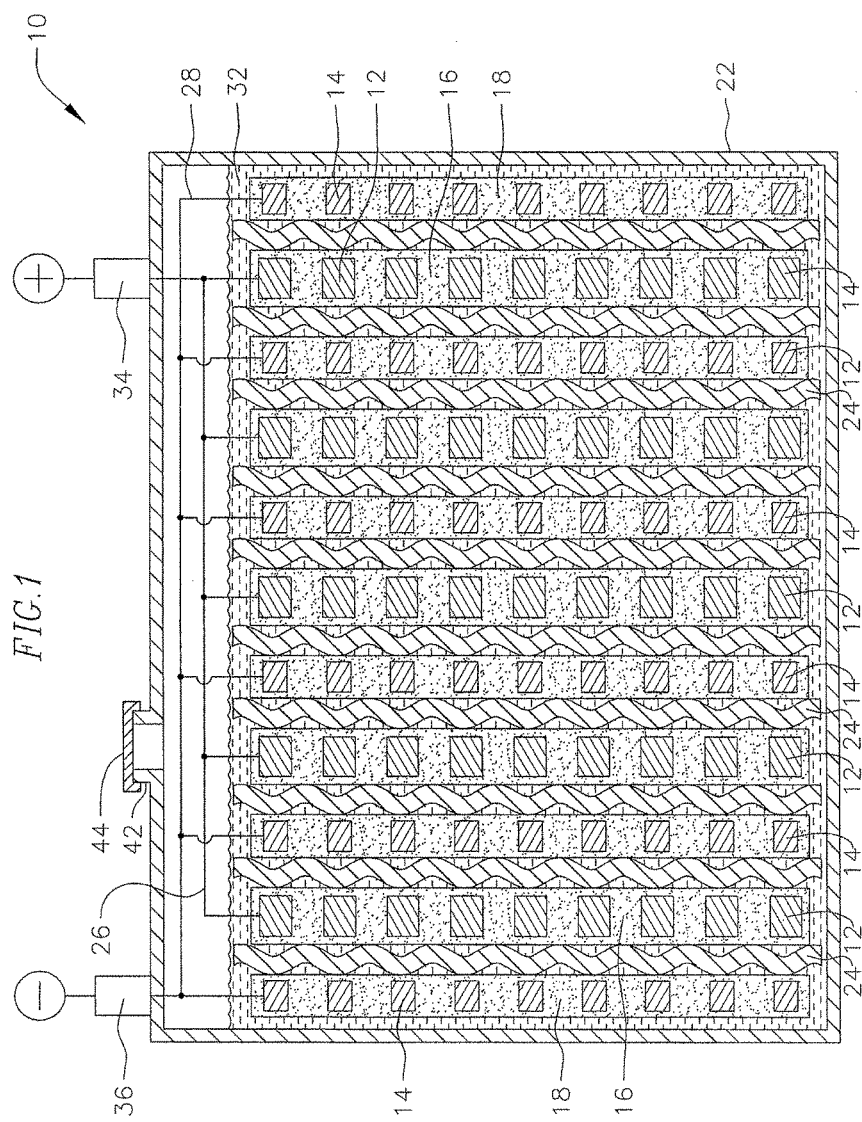
FIG. 1 is a schematic sectional view of a flooded deep discharge lead-acid battery according to one embodiment of the present invention.

According to one embodiment of the invention, a positive active material paste for a flooded deep discharge lead-acid battery includes lead oxide, a sulfate additive, and an aqueous acid solution. The sulfate additive may be any suitable metal or metal oxide sulfate compound, nonlimiting examples of which include $SnSO_4$, $ZnSO_4$, $TiOSO_4$, $CaSO_4$, $K_2SO_4$, $Bi_2(SO_4)_3$ and $In_2(SO_4)_3$.

According to embodiments of the invention, enough sulfate additive is provided to the paste to yield a lead to metal (or metal oxide) molar ratio ranging from about 90:1 to about 1000:1, and in one embodiment, for examples the molar ratio of lead to the metal (or metal oxide) ranges from about 99:1 to about 997:1. In one exemplary embodiment, enough additive is supplied such that the lead to metal (or metal oxide) molar ratio of the positive active material paste is greater than about 450:1. In another embodiment, the lead to metal (or metal oxide) molar ratio of the positive active material paste is between about 450:1 and about 650:1. In yet another embodiment, the lead to metal additive molar ratio of the positive active material paste is about 500:1.

In some embodiments of the invention, enough sulfate additive is provided to the paste to yield a lead to metal (or metal oxide) weight ratio ranging from about 170:1 to about 1750:1, and in one embodiment, for example the weight ratio of lead to the metal (or metal oxide) ranges from about 173:1 to about 1741:1. In one exemplary embodiment, enough additive is supplied such that the lead to metal (or metal oxide) weight ratio of the positive active material paste is greater than about 750:1. In another embodiment, the lead to metal (or metal oxide) weight ratio of the positive active material paste is between about 750:1 and about 1150:1. In yet another embodiment, the lead to metal additive molar ratio of the positive active material paste is about 870:1.

For embodiments where tin is used as the metal in the additive (i.e., the additive is tin sulfate), the lead to tin weight ratio of the positive active material paste may be greater than about 800:1. In another embodiment, the lead to tin weight ratio of the positive active material paste is between about 800:1 and 1100:1. In yet another embodiment, the lead to tin weight ratio of the positive active material paste is about 900:1 which corresponds to an initial amount of tin sulfate of about 0.2 wt % in the positive active material paste applied to the positive grid prior to battery formation.

In order to provide a lead to metal (or metal oxide) molar ratio within the ranges discussed above, in one embodiment, the sulfate additive is provided to the paste in an amount ranging from about 0.1 to about 1 wt % on a dry basis. In another embodiment, the sulfate additive is provided to the paste in an amount of about 0.2 wt % on a dry basis. When using $SnSO_4$ as the sulfate additive, addition of more than about 1 wt % in the positive paste prior to battery formation may cause undesirable tin migration to the negative electrode grid. Adding high amounts of additive may also be cost prohibitive. Based on an amount of additive provided to the paste of about 0.2 wt % on a dry basis, and depending on the purity of the additive (which varies), the lead to metal (or metal oxide) molar ratio may range from about 200:1 to about 825:1, and in one embodiment ranges from about 201:1 to about 823:1.

Surprisingly, according to an embodiment of the present invention, the small amount of metal added to the positive active material provides significant improvements in battery performance. In addition, the small amount of metal additive does not tend to cause any significant tin poisoning at the negative electrode as might have been expected.

Without being bound by theory, it is believed that the inclusion of the metal additive in the positive active material paste according to embodiments of the present invention changes the crystal structure of the positive active material paste. As a result, it is believed that the active material has a higher surface area on which electrochemical reactions can occur. Accordingly, the deep discharge batteries having the uniform crystal structure and higher active material surface area can withstand deep discharge with less deterioration in the charge capacity over the life of the battery, thus improving performance.

In particular, the inclusion of tin as the metal of the additive in the positive active paste at a lead to tin weight ratio of about 900:1 can lower the $\alpha$-$PbO_2$ to $\beta$-$PbO_2$ ratio to between about 0.8 and 1.0. Such a balance of $\alpha$-$PbO_2$ to $\beta$-$PbO_2$ has surprisingly shown to result in a battery with both high initial capacity and long battery life. It has further been shown that at sulfate levels higher than about 0.2 wt %, the porosity of the positive active paste material increases. Such an increase in porosity normally tends to adversely affect battery performance. Higher porosity indicates a higher volume of pores, enabling the electrolyte to more easily penetrate inside the active material solid matrix. Although this may improve initial battery performance, the positive active material will expand and shrink during charge and discharge (cycling), and the highly porous structure will decrease the mechanical strength and shorten the cycle life of the active material.

According to another embodiment of the present invention, a method for preparing a positive active material paste includes mixing lead oxide, a binder such as polyester fiber, and a metal sulfate additive to form a dry mixture. Water is then added to the dry mixture and the mixture is wet-mixed for a period of time. After wet-mixing, acid is added and mixing continues.

In one embodiment, as shown somewhat schematically in FIG. 1, a single cell flooded deep discharge lead-acid battery 10 includes the positive active material paste as set forth above. The battery includes a plurality of positive electrode grids 12, and a plurality of negative electrode grids 14. Each positive electrode grid is coated with a positive active material paste 16 as set forth above to form a positive plate. Each negative electrode grid is coated with a negative active material paste 18 to form a negative plate. The coated positive and negative electrode grids are arranged in an alternating stack within a battery case 22 using a plurality of separators 24 to separate each electrode grid from adjacent electrode grids and prevent short circuits. A positive current collector 26 connects the positive electrode grids and a negative current collector 28 connects the negative electrode grids. An electrolyte solution 32 fills the battery case, and positive and negative battery terminal posts 34, 36 extend from the battery case to provide external electrical contact points used for charging and discharging the battery. The battery case includes a vent 42 to allow excess gas produced during the charge cycle to be vented to atmosphere. A vent cap 44 prevents electrolyte from spilling from the battery case. While a single cell battery is illustrated, it should be clear to one of ordinary skill in the art that the invention can be applied to multiple cell batteries as well.

According to one embodiment, the positive electrode grids are made from a lead-antimony alloy. In one embodiment, the electrode grids are alloyed with about 2 wt % to about 11 wt % antimony. In another embodiment, the electrode grids are alloyed with between about 2 wt % and about 6 wt % antimony.

The negative electrode grids are similarly made from an alloy of lead and antimony, but generally include less antimony than the alloy used for the positive electrode grids. The negative electrode grids also tend to be somewhat thinner than the positive electrode grids. Such negative electrode grids are well known in the art. The negative electrode grids are coated with a negative active material that includes lead oxide and an expander as is also well known in the art. Upon battery formation, the lead oxide of the negative active material is converted to lead.

Suitable electrolytes include aqueous acid solutions. In one embodiment, the electrolyte comprises a concentrated aqueous solution of sulfuric acid having a specific gravity of about 1.1 to about 1.3 prior to battery formation. The separators are made from any one of known materials. Suitable separators are made from wood, rubber, glass fiber mat, cellulose, poly vinyl chloride, and polyethylene.

Figure 2:
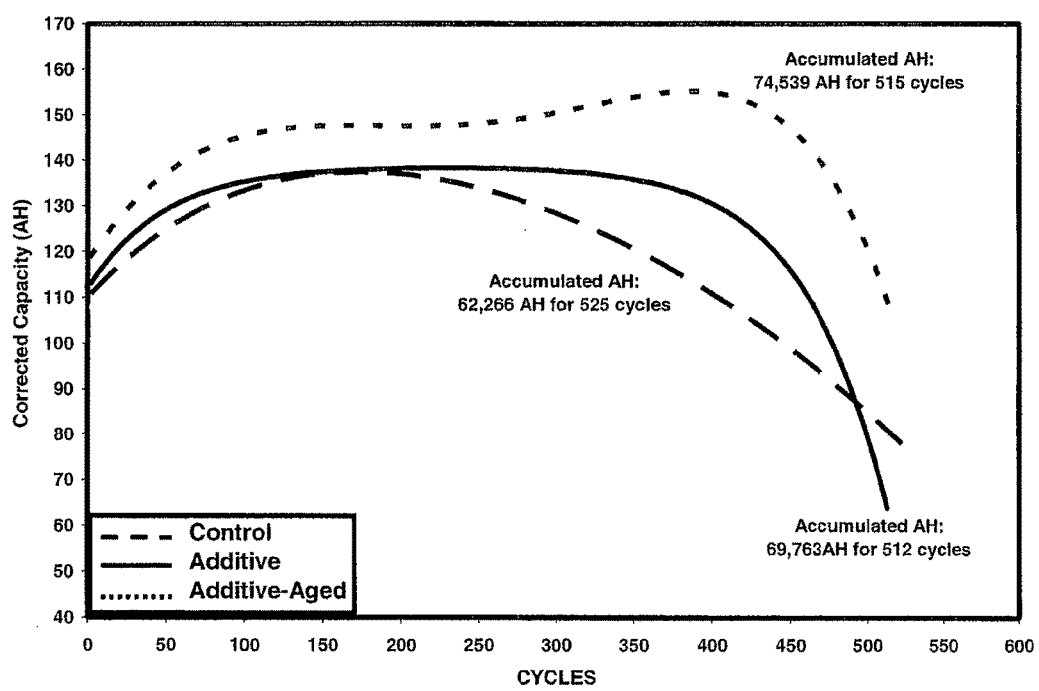
FIGS. 2 through 4 are graphs comparing the cycle life of flooded deep discharge lead-acid batteries according to embodiments of the present invention to a control battery in which no additive is used.

According to some embodiments, the completed battery may be aged after formation. In particular, after initial charging (i.e., battery formation), the battery may be allowed to stand without use for an aging period. The aging period may range from about 2 months to about 6.5 months. Batteries according to embodiments of the present invention that have been aged after formation have surprisingly exhibited better results than their non-aged counterparts. These results are shown in FIG. 2, discussed in detail below relative to Examples 2 and 3.

The present invention will now be described with reference to the following examples. These examples are provided for illustrative purposes only, and are not intended to limit the scope of the present invention.

Example 1: Positive Active Material Paste and Positive Plate Formation

A positive active material paste was made by first mixing 2400 lbs of lead oxide powder and 2 lbs of polyester fiber in a mixer. To that mixture, 4.40 lbs of tin sulfate was added while mixing continued. Then, specified amounts of water and acid were added and mixing continued until a positive active material paste was formed. The positive paste included lead oxide, polyester fiber, water, and aqueous sulfuric acid. The paste density was about 4.5 g/cc, which is considered a high density paste and suitable for cycling applications. The resulting paste was gray in color and had a tin sulfate concentration of about 0.18 wt % on a dry basis.

The positive active material paste was applied to identical positive electrode grids using a Mac Engineering & Equipment Co. commercial pasting machine to form pasted positive plates. The positive electrode grids were cast using a Wirtz Manufacturing Co. grid casting machine using a lead-antimony alloy with 4.5% antimony. Each positive electrode grid was pasted with positive active material paste. The resulting positive plates were then dried in a flash drying oven according to well known methods. The dried positive plates were then cured by a two-step process in a curing chamber, first at 100% humidity for sixteen hours, and the plates were then dried under high temperature without humidity until the moisture content inside the plate was below 4%.

Comparative Example 1: Conventional Positive Active Material Paste and Plate Formation A positive active material paste and positive plates identical to those described at Example 1 were made using the method described at Example 1 with the exception that no metal sulfate additive was included in the positive active material paste.

Examples 2-3: Battery Assembly

According to Examples 2 and 3, the positive plates formed according to Example 1 were assembled into twelve production batteries of the type manufactured and sold by Trojan Battery Corporation as Model T105 (3-cell, 6-volt, deep discharge lead-acid battery, a type commonly used in electric golf cars). In other words, with the exception that the positive plates of Example 1 were used instead of conventional positive plates, all other components and manufacturing steps were identical to those employed in making conventional Model T105 batteries. In particular, individual cell groups were formed by stacking eight positive plates of Example 1 and nine conventional negative plates in an alternating arrangement with conventional separators between them. The negative plates comprised negative electrode grids made from an alloy of 2.75 wt % antimony in lead. Each negative electrode grid was pasted with negative paste comprising lead oxide, deep cycle expander, polyester fiber, water, and aqueous sulfuric acid. The negative paste density was about 4.3 g/cc, which represents a typical negative paste in the lead acid battery industry. The positive plates were then dried in a flash drying oven and cured using the same procedures as were used for the negative plates. The separators used were rubber separators made by Microporous Products, L.P. The deep cycle expander was provided by Atomized Products Group, Inc.

The tabs of the negative plates of each cell group were welded together using known procedures as were the tabs of the positive plates of each cell group. For each battery, three cell groups were interconnected in series as is well-known in the assembly of three-cell batteries, and the combination of three cell groups was inserted into a battery case. The case was then sealed and the battery terminals were welded into place. The assembled batteries were then filled with aqueous sulfuric acid and covers were placed over the vents. For each of Examples 2 and 3, the assembled batteries were connected in series, and within thirty minutes of filling the batteries with acid, the battery formation step was initiated. According to the battery formation step, a charge was applied to the series of batteries using a constant current formation procedure to form the plates. The formation was terminated until the total charge energy reached about 190 to about 220% of the theoretical charge energy based on the quantity of positive active material and charging efficiency. The final specific gravity of the aqueous sulfuric acid inside the batteries was about 1.275. The formed batteries were then placed on a shelf for a 21 day pre-condition period before performing cycle tests. After pre-conditioning, a number of the formed batteries were aged on the shelf for an additional six months.

Comparative Example 2: Conventional Battery Assembly

For Comparative Example 2, batteries identical to those of Examples 2 and 3 were constructed, except that the conventional positive plates of Comparative Example 1 were used in the assembly.

For a first test, six conditioned batteries of Example 2 were compared against six conventional batteries of Comparative Example 2 immediately after conditioning. In particular, the six batteries of Example 2 were set up in series on one test circuit while the six batteries of Comparative Example 2 were set up in series on another test circuit. For a second test, the six batteries of Example 3 were aged for another six months before being set up in series on yet another test circuit.

For the tests, the batteries were repeatedly discharged and charged using standard procedures as established by Battery Council International. In particular, the batteries were discharged at a constant 75 amps down to a cut-off voltage of 1.75 V per cell. For each circuit, the total discharged capacity for each discharge cycle was determined in Ampere-hours. Once the batteries of a circuit were discharged, the circuit was rested for 30 minutes before recharging. After the rest step, the batteries were recharged using a three-step I-E-I charge profile up to 110% of the capacity discharged on the immediately preceding discharge cycle. In this 3-step charge profile, the first step employs a constant start current in which charge current to the batteries is maintained at a constant value (in this case 17.7 A) during the initial charge stage until the battery voltage per cell reaches a specified level (in this case 2.35 VPC). In the second step, the battery voltage is maintained at a steady voltage while being charged with decreasing current. In the third step, a lower constant current is delivered to the batteries (in this case 4.5 A). Such a charge profile is abbreviated in this specification as "IEI 7.7 A-2.35VPC-4.5 A-110%." Once recharged, the battery circuit was rested for two hours before being discharged. These steps were repeated until the batteries failed to deliver 50% of the manufacturer's rated capacity on a discharge cycle. Defective batteries may have been removed from the string during cycle life testing, not exceeding removal of 50% of the total batteries in the circuit. Also, no replacement batteries were added during testing.

The results of the tests are shown in FIG. 2, which graphs capacity per cycle against the number of cycles, where the capacity per cycle is corrected for temperature using standardization procedures set forth by Battery Council International. FIG. 2 shows the effect of additive on 6V golf lead acid batteries. Batteries with additive show better performance than control batteries. In addition, as shown in FIG. 2, the batteries that were aged an additional six months performed significantly better than their non-aged counterparts. The curve fitting was based on the polynomial regression function of the Microsoft Excel program.

As illustrated by FIG. 2, the batteries of the present invention exhibit consistently higher ampere hour discharge and sustained peak capacity for longer periods of time. Moreover, the battery circuit using batteries according to Example 2 exhibited consistently higher ampere-hour discharge per cycle. The Example 3 batteries have delivered higher performance than the Example 2 batteries. This is due to a longer aging period, which helps produce more sulfates inside the PAM (positive active material) matrix and improves utilization of the PAM during cycling. The total ampere-hour capacity over the life of the test batteries is summarized in Table 1.

TABLE 1

| Test | Cycles | Total Accumulated Ampere-Hours | Average Ampere-Hours per cycle |
| --- | --- | --- | --- |
| Example 2 | 512 | 69,763 | 136 |
| Example 3 | 515 | 74,539 | 145 |
| Comparative Example 2 | 525 | 62,266 | 119 |

Example 4 and Comparative Example 3

For Example 4, the positive plates formed according to Example 1 were assembled into six production batteries of the type manufactured and sold by Trojan Battery Corporation as Model J305P (3-cell, 6-volt, deep discharge lead-acid batteries of a type commonly used in scrubber & floor machine batteries). For Comparative Example 3, batteries identical to those of Example 4 were constructed, except that the conventional positive plates of Comparative Example 1 were used in the assembly.

Figure 3:
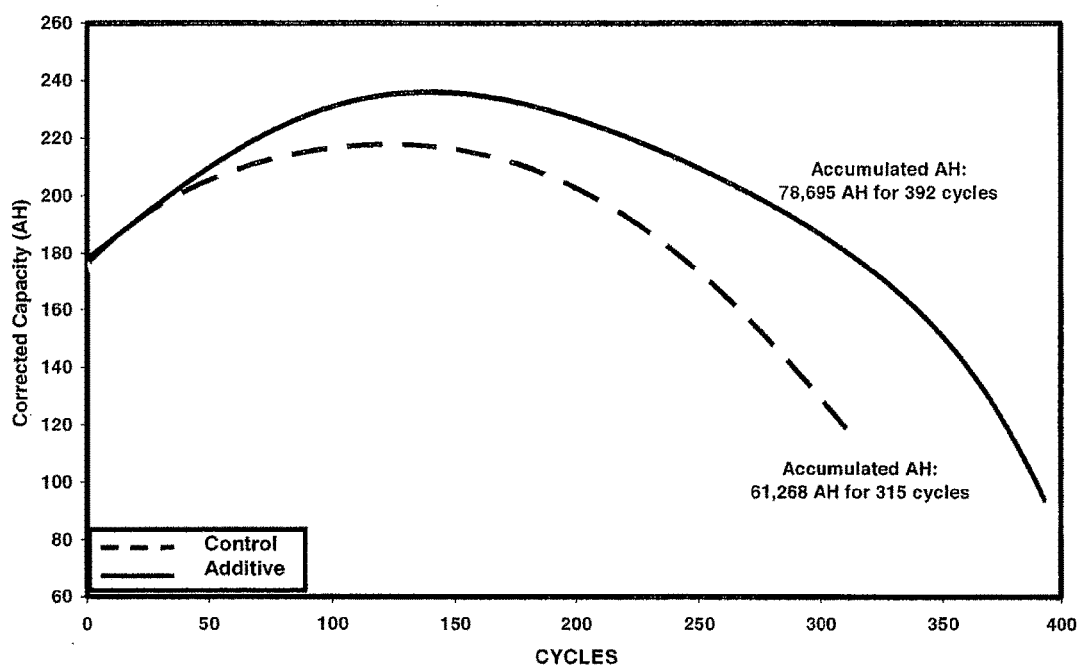

The results of the tests are shown in FIG. 3 which graphs capacity per cycle against the number of cycles, where the capacity per cycle is corrected for temperature using standardization procedures set forth by Battery Council International. FIG. 3 shows the effect of additive on 6V scrubber batteries. Batteries with additive show better performance than the control batteries. The curve fitting was based on the polynomial regression function of the Microsoft Excel program.

As illustrated by FIG. 3, the batteries of the present invention exhibit consistently higher ampere hour discharge and sustained peak capacity for longer periods of time. Moreover, these test results re-confirm the conclusions gained from FIG. 2 that the batteries of the present invention show similar effects and benefits on different models of lead acid battery products. The total ampere-hour capacity over the life of the test batteries is summarized in Table 2.

TABLE 2

| Test | Cycles | Total Accumulated Ampere-Hours | Average Ampere-Hours per cycle |
| --- | --- | --- | --- |
| Example 4 | 392 | 78,695 | 201 |
| Comparative Example 3 | 315 | 61,268 | 194 |

Examples 5-11 and Comparative Example 4

For Examples 5-11, positive active material pastes were prepared including various additive salts as set forth in Table 3. For Comparative Example 4, a conventional positive active material paste was prepared without any additive. The positive active material pastes were prepared in a lab scale mixer. Each positive active material paste was made by first mixing 10 lbs of lead oxide powder and 3.8 grams of polyester fiber in a mixer. To that mixture, 9.08 grams of additive was added while mixing continued. Then, water was added to the dry mixture and mixing continued for one minute. Finally, an aqueous solution of sulfuric acid was added and mixing continued until a positive active material paste was formed. The resulting paste was gray in color and had an additive concentration of about 0.20 wt % on a dry basis.

The positive active material pastes prepared above were manually applied to substantially identical positive electrode grids to form pasted positive plates. The positive electrode grids were made as described in Example 1, and were used in a 2-volt single cell jar for cycle life testing. Each positive electrode grid weighed 144+/−5 grams and was pasted with 278+/−3 grams of positive active material paste. The resulting positive plates were then cured by a two-step process in a lab scale curing chamber.

TABLE 3

| Example | Metal (or Metal Oxide) | Metal (or Metal Oxide) Salt | Metal (or Metal Oxide) Salt Amount (wt % dry basis) | Pb:Metal (or Metal Oxide) Molar Ratio |
| --- | --- | --- | --- | --- |
| Example 5 | Sn | $SnSO_4$ | 0.20% | 500 |
| Example 6 | TiO | $TiOSO_4$ | 0.20% | 334 |
| Example 7 | Ca | $CaSO_4$ | 0.20% | 314 |
| Example 8 | K | $K_2SO_4$ | 0.20% | 201 |
| Example 9 | In | $In_2(SO_4)_3 \cdot xH_2O$ | 0.20% | 729 |
| Example 10 | Zn | $ZnSO_4 \cdot 7H_2O$ | 0.20% | 663 |
| Example 11 | Bi | $Bi_2(SO_4)_3$ | 0.20% | 823 |

The single cells made for Examples 5-11 and Comparative Example 4 were tested in the same manner as the Example 2 batteries. The total ampere-hour capacity over the life of the test batteries is summarized in Table 4.

TABLE 4

| Example | Metal (or Metal Oxide) | Cycle | Total Accumulated Ampere-Hours | Average Ampere-Hours per cycle |
| --- | --- | --- | --- | --- |
| Example 5* | Sn | 169 | 23,101 | 137 |
| Example 6 | TiO | 200 | 23,068 | 115 |
| Example 7 | Ca | 200 | 25,938 | 130 |
| Example 8 | K | 200 | 25,681 | 128 |
| Example 9 | In | 200 | 25,980 | 130 |
| Example 10 | Zn | 200 | 24,667 | 123 |
| Example 11 | Bi | 200 | 24,996 | 125 |
| Comparative Example 4 | N/A | 200 | 25,630 | 128 |

*Testing was stopped prematurely due to equipment failure.

Examples 12 and 13 and Comparative Example 5

For Examples 12 and 13, positive active material pastes were prepared including various tin sulfate contents as set forth in Table 5. The quantities of acid and water needed to be adjusted as the additive content increased. The density of the positive paste changed due to the adjustment of acid/water quantity. The densities of the positive paste for each mix varied from about 4.3 to about 4.7 g/cc. For Comparative Example 5, a conventional positive active material paste was prepared without any metal additive. The positive active material pastes prepared as above were manually applied to substantially identical positive electrode grids to form pasted positive plates. The positive electrode grids were made as described in Example 1, and were used in 2-volt single cell jars for cycle life testing. Each positive electrode grid weighed 144+/−5 grams and was pasted with 278+/−3 grams of positive active material paste. The resulting positive plates were then cured under the same conditions as Examples 5-11.

TABLE 5

| Example | Tin Sulfate Amount (wt % dry basis) | Pb:Sn Weight Ratio | Pb:Sn Molar Ratio |
|---|---|---|---|
| Example 12 | 0.2% | 870 | 498 |
| Example 13 | 1.0% | 173 | 99 |
| Comparative Example 5 | 0.0% | N/A | N/A |

Figure 4:
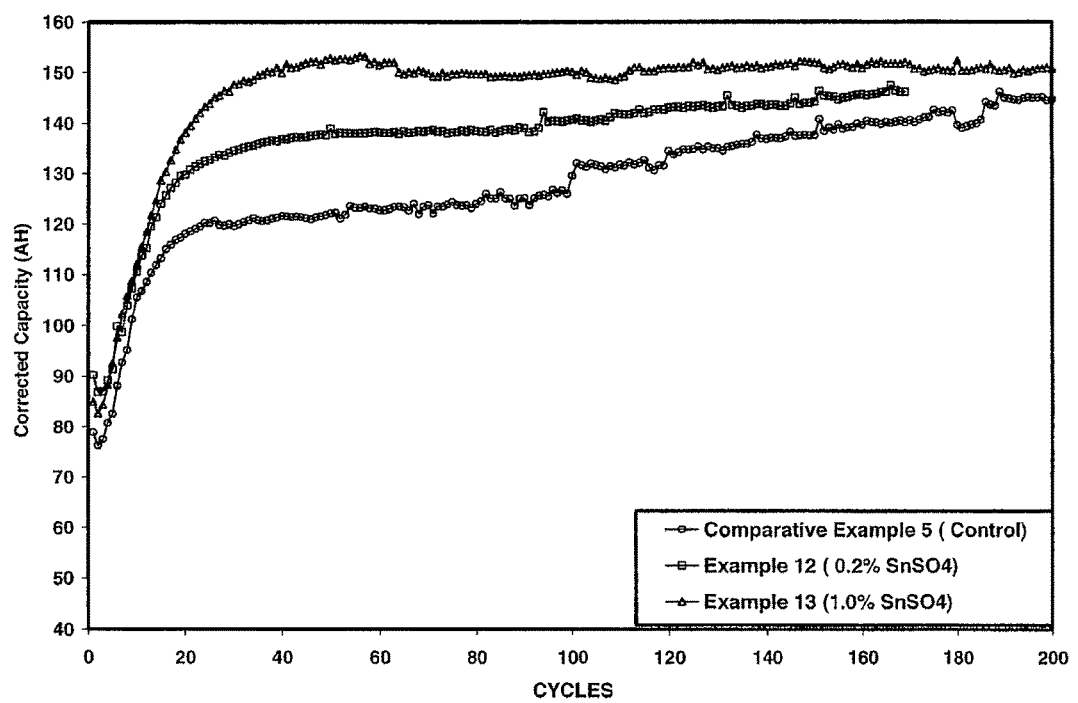

The single cells made for Examples 12 and 13 and Comparative Example 5 were tested in the same manner as the Example 2 batteries. The total ampere-hour capacity over the life of the test batteries is summarized in Table 6. The results of the tests are shown in FIG. 4 which graphs capacity per cycle against the number of cycles, where the capacity per cycle is corrected for temperature as mentioned above. As illustrated by FIG. 4, the batteries of the present invention exhibit consistently higher ampere hour discharge energy than conventional batteries.

TABLE 6

| Example | Tin Sulfate Amount (wt % dry) | Cycle | Total Accumulated Ampere-Hours | Average Ampere-Hours per cycle |
|---|---|---|---|---|
| Example 12* | 0.2% | 169 | 23,101 | 137 |
| Example 13 | 1.0% | 200 | 29,296 | 147 |
| Comparative Example 5 | 0.0% | 200 | 25,630 | 128 |

*Testing was stopped prematurely due to equipment failure.

While the present invention has been illustrated and described with reference to certain exemplary embodiments, those of ordinary skill in the art would appreciate that various modifications and changes can be made to the described embodiments without departing from the spirit and scope of the present invention, as defined in the following claims.

What is claimed is:

1. A method for making a flooded lead-acid battery comprising:
   casting a plurality of positive electrode grids from a first lead-antimony alloy;
   casting a plurality of negative electrode grids from a second lead-antimony alloy,
   applying a negative active material paste to the plurality of negative electrode grids to form a plurality of negative plates, the negative active material comprising lead oxide;
   applying a positive active material paste to the plurality of positive electrode grids to form a plurality of positive plates, the positive active material paste comprising lead oxide, a binder, and a metal sulfate comprising a metal selected from the group consisting of tin, zinc, titanium, calcium, potassium, bismuth, indium, and combinations thereof, wherein the molar ratio of lead to the metal in the positive active material paste is from about from about 450:1 to about 650:1;
   arranging the plurality of positive and negative plates in an alternating arrangement in a battery case with the positive and negative plates separated from one another by a plurality of separators;
   adding an aqueous electrolyte to the battery case; and
   applying a charge across the positive and negative plates, thereby forming the flooded lead-acid battery.

2. The method of claim 1 wherein the metal sulfate is tin sulfate, and the tin sulfate is present in the positive active material paste in an amount from about 0.1 wt % to about 1 wt % on a dry basis.

3. The method of claim 2 wherein the tin sulfate is present in the positive active material paste in an amount from about 0.15 wt % to about 0.2 wt % on a dry basis.

4. The method of claim 2 wherein the tin sulfate is present in the positive active material paste in an amount of about 0.18 wt % on a dry basis.

5. The method of claim 1 further comprising aging the flooded lead-acid battery for a period of time from about 2 months to about 6½ months.

6. The method of claim 1 wherein the first and second lead-antimony alloys comprise between about 2 wt % and 6 wt % of antimony.

7. The method of claim 6 wherein the second lead-antimony alloy contains a lower percentage of antimony than the first lead-antimony alloy.

8. A method for making a flooded lead-acid battery comprising:
   casting a plurality of positive electrode grids from a first lead-antimony alloy;
   casting a plurality of negative electrode grids from a second lead-antimony alloy, wherein the second lead-antimony alloy contains a lower percentage of antimony than the first lead-antimony alloy;
   applying a negative active material paste to the plurality of negative electrode grids to form a plurality of negative plates, the negative active material comprising lead oxide;
   applying a positive active material paste to the plurality of positive electrode grids to form a plurality of positive plates, the positive active material paste comprising lead oxide, a binder, and tin sulfate, wherein the tin sulfate is present in the positive active material paste in an amount from about 0.1 wt % to about 1 wt % on a dry basis;
   arranging the plurality of positive and negative plates in an alternating arrangement in a battery case with the positive and negative plates separated from one another by a plurality of separators;
   adding an aqueous electrolyte to the battery case; and
   applying a charge across the positive and negative plates, thereby forming the flooded lead-acid battery.

9. The method of claim 8 wherein the tin sulfate is present in the positive active material paste in an amount from about 0.15 wt % to about 0.2 wt % on a dry basis.

10. The method of claim 8 wherein the tin sulfate is present in the positive active material paste in an amount of about 0.18 wt % on a dry basis.

11. The method of claim 8 further comprising aging the flooded lead-acid battery for a period of time from about 2 months to about 6½ months.

12. The method of claim 8 wherein the first and second lead-antimony alloys comprise between about 2 wt % and 6 wt % of antimony.

13. A positive plate for a flooded lead-acid battery comprising an unclad cast electrode grid made of a lead-antimony alloy comprising from about 2 to about 11 wt % antimony, wherein the unclad cast electrode grid is coated with a positive active material paste comprising lead oxide, a binder, and tin sulfate, wherein the tin sulfate is present in the positive active material paste in an amount from about 0.1 wt % to about 1 wt % on a dry basis.

14. The positive plate of claim 13 wherein the tin sulfate is present in the positive active material paste in an amount from about 0.15 wt % to about 0.2 wt % on a dry basis.

15. The positive plate of claim 13 wherein the tin sulfate is present in the positive active material paste in an amount of about 0.18 wt % on a dry basis.

16. The positive plate of claim 13 wherein lead-antimony alloy comprises between about 2 wt % and 6 wt % of antimony.

17. A method for making a positive plate for a flooded lead-acid battery comprising:
   casting a positive electrode grid from a lead-antimony alloy, wherein the lead-antimony alloy comprises between about 2 wt % and 6 wt % of antimony;
   applying a positive active material paste to the cast positive electrode grid, the positive active material paste comprising lead oxide, a binder, and tin sulfate, wherein the tin sulfate is present the positive active material paste in an amount from about 0.1 wt % to about 1 wt % on a dry basis.

18. The method of claim 17 wherein the tin sulfate is present in the positive active material paste in an amount from about 0.15 wt % to about 0.2 wt % on a dry basis.

19. The method of claim 17 wherein the tin sulfate is present in the positive active material paste in an amount of about 0.18 wt % on a dry basis.

* * * * *